US009746962B2

(12) United States Patent
Wu et al.

(10) Patent No.: US 9,746,962 B2
(45) Date of Patent: Aug. 29, 2017

(54) FREQUENCY SELECTING MODULE AND RELATED COMPUTING DEVICE AND FREQUENCY SELECTING METHOD

(71) Applicant: Sitronix Technology Corp., Hsinchu County (TW)

(72) Inventors: Chun-Kuan Wu, Hsinchu County (TW); Chen-Yuan Yang, Hsinchu County (TW); Ching-Jen Tung, Hsinchu County (TW); Chun-Yu Lin, Hsinchu County (TW); Wang-An Lin, Hsinchu County (TW)

(73) Assignee: Sitronix Technology Corp., Hsinchu County (TW)

( * ) Notice: Subject to any disclaimer, the term of this patent is extended or adjusted under 35 U.S.C. 154(b) by 148 days.

(21) Appl. No.: 14/836,975

(22) Filed: Aug. 27, 2015

(65) Prior Publication Data

US 2016/0370941 A1 Dec. 22, 2016

(30) Foreign Application Priority Data

Jun. 22, 2015 (TW) ............................ 104119943 A

(51) Int. Cl.
*G09G 3/36* (2006.01)
*G06F 3/041* (2006.01)

(52) U.S. Cl.
CPC .................................. *G06F 3/0418* (2013.01)

(58) Field of Classification Search
CPC .................................................... G06F 3/0418
USPC ........................................................ 345/173
See application file for complete search history.

(56) References Cited

U.S. PATENT DOCUMENTS

2013/0222290 A1* 8/2013 Choi ...................... G06F 3/041 345/173
2015/0355783 A1* 12/2015 Hung ................... G06F 3/0412 345/173

FOREIGN PATENT DOCUMENTS

CN 103577014 A 2/2014
CN 104635978 A 5/2015
TW 201335815 9/2013
TW 201435701 9/2014

* cited by examiner

*Primary Examiner* — Jonathan Boyd
(74) *Attorney, Agent, or Firm* — Winston Hsu

(57) ABSTRACT

A frequency selecting module for a touch system includes a storage unit, for storing a sum of at least one of a plurality of sensing signals of a plurality sensing channels in the touch system; a spectrum calculating unit, for transforming the sum of the at least one of the plurality of sensing signals stored in the storage unit to generate a spectrum data and storing the spectrum data to the storage unit; and a selecting unit, for generating an adjusting signal according to the spectrum data to select one of a plurality of operation frequencies as a working frequency of the plurality of sensing signals.

6 Claims, 3 Drawing Sheets

30
300 Start
302 Transform a sum of at least one of a plurality of sensing signals of the plurality of sensing channels in the touch panel, to acquire spectrum data
304 Select one of a plurality of operation frequencies as the working frequency according to the spectrum data
306 End

FREQUENCY SELECTING MODULE AND RELATED COMPUTING DEVICE AND FREQUENCY SELECTING METHOD

BACKGROUND OF THE INVENTION

1. Field of the Invention

The present invention relates to a frequency selecting module for a touch system and related processing device and frequency selecting method, and more particularly, to a frequency selecting module utilized for selecting the working frequency of a plurality of sensing channels in the touch system and related processing device and frequency selecting method.

2. Description of the Prior Art

The trend of consumer electronic products is toward to light, thin, short and small. Thus, the electronic products contain no room for the conventional input devices such as mouse and keyboard. With advances in touch technology, the electronic products such as tablets, mobile phones, personal digital assistants (PDAs) and all in one widely adopt touch systems as the input device. When the touch system operates, other circuits in the electronic product works simultaneously and may generate noise interference on a plurality of sensing channels of the touch system. The touch system may work abnormally because of the noise. Thus, how to avoid the operations of the touch system being affected by the noise becomes a topic to be discussed.

SUMMARY OF THE INVENTION

In order to solve the above problem, the present invention provides a frequency selecting module utilized for selecting the working frequency of a plurality of sensing channels in the touch system and related processing device and frequency selecting method.

The present invention discloses a frequency selecting module for a touch system. The frequency selecting module comprises a storage unit, for storing a sum of at least one of a plurality of sensing signals of a plurality sensing channels in the touch system; a spectrum calculating unit, for transforming the of the at least one of the plurality of sensing signals stored in the storage unit to generate a spectrum data and storing the spectrum data to the storage unit; and a selecting unit, for generating an adjusting signal according to the spectrum data to select one of a plurality of operation frequencies as a working frequency of the plurality of sensing signals.

The present invention further discloses a frequency selecting method for a touch system. The frequency selecting method comprises transforming at least one of a plurality of sensing signals of a plurality of sensing channels in the touch system, to generate spectrum data; and selecting one of a plurality of operation frequencies as a working frequency of the plurality of sensing signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
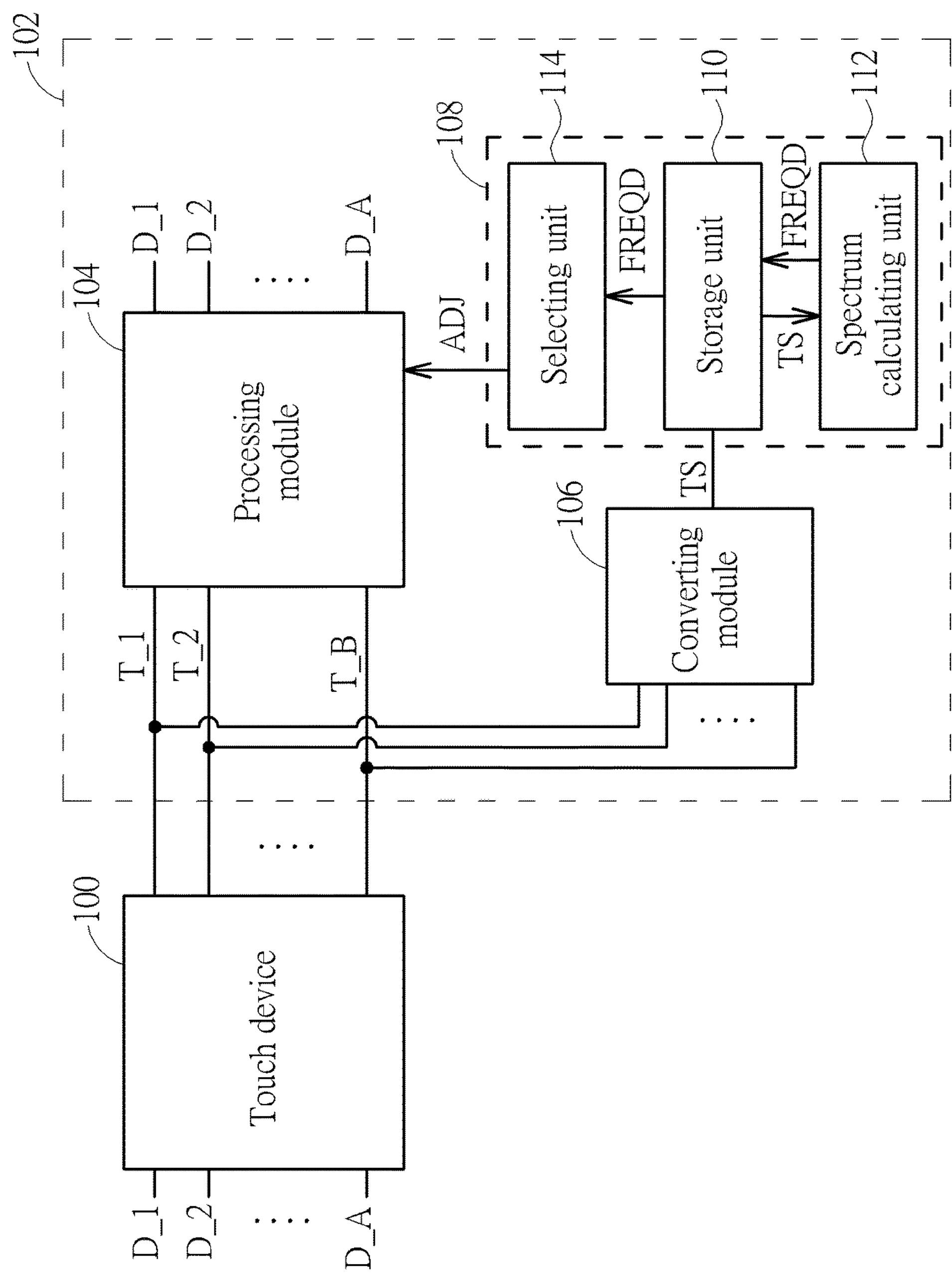
FIG. 1 is a schematic diagram of a touch system according to an example of the present invention.

Please refer to FIG. 1, which is a schematic diagram of a touch system 10 according to an example of the present invention. The touch system 10 may be an electronic product with a touch panel, such as a smart phone, a tablet or a digital camera. The touch system 10 shown in FIG. 1 comprises a touch device 100 and a processing device 102 for illustrations. The components not directly relating to the concept of the present invention, such as the housing, are not shown in FIG. 1 for brevity. The touch device 100 is utilized for sensing touches of an object according to driving signals D_1-D_A, to generate sensing signals T_1-T_B. For example, the touch device 100 may be a touch panel and the sensing signals T_1-T_B are the sensing signals generated by vertical and horizontal sensing channels in the touch panel. The processing device 102 comprises a processing module 104, a converting module 106 and a frequency selecting module 108. The processing module 104 is coupled to the touch device 100 and is utilized for generating the driving signals D_1-D_A and determining touch positions at which the object touches according to the sensing signal T_1-T_B. The converting module 106 is utilized for selecting one of the sensing signals T_1-T_B as the sensing signal TS. The frequency selecting module 108 calculates spectrum data FREQD of noise according to the sensing signal TS. Next, the frequency selecting module 108 selects one of a plurality of operation frequencies FO_1-FO_C as a working frequency FW and adjusts frequencies of the driving signals D_1-D_A and the sensing signal T_1-T_B to the working frequency FW. The touch system 10 therefore can avoid that the operations of the touch device 100 are effected by the environment noise.

In details, the frequency selecting module 108 comprises a storage unit 110, a spectrum calculating unit 112, and a selecting unit 114. The storage unit 110 is utilized for storing the sensing signal TS generated by the converting module 106. In an example, the sensing signal TS is one of the sensing signal T_1-T_B when the driving signals D_1-D_A do not drive the touch device 100. Note that, the converting module 106 may be omitted if the storage unit 110 equips with the function of selecting and storing one of the sensing signal T_1-T_B. According to the sensing signal T_S stored in the storage unit 110, the spectrum calculating unit 112 calculates the spectrum data FREQD of the noise and stores the spectrum data FREQD to the storage unit 110. In an example, the spectrum calculating unit 112 transforms the sensing signal TS via Fast Fourier Transform (FFT), to acquire amplitudes of the sensing signal TS at a plurality of sampling points as the spectrum data FREQD.

Next, the selecting unit 114 calculates noise levels NL_1-NL_C of the operation frequencies FO_1-FO_C according to the spectrum data FREQD stored in the storage unit 110. For example, the selecting unit 114 calculates the sum of amplitudes on the plurality of sampling points around the operation frequency FO_1 as the noise level NL_1 of the operation frequency FO_1; calculates the sum of amplitudes on the plurality of sampling points around the operation frequency FO_2 as the noise level NL_2 of the operation frequency FO_2; and so on. After acquiring the noise levels NL_1-NL_C, the selecting unit 114 selects the operation frequency with the minimum noise level among the noise levels NL_1-NL_C as the working frequency FW and adjusts the frequencies of the driving signals D_1-D_A and the sensing signals T_1-T_B to the working frequency FW via the adjusting signal ADJ. The touch device 110 and the processing module 104 can avoid to be affected by the environment noise, therefore.

In addition, the selecting unit 114 may limit a difference between the working frequency FW and a main noise frequency Fnoise corresponding to the maximum noise amplitude in the spectrum data FREQD to be greater than a predefined frequency FTH (i.e. $|FW-Fnoise| \geq FTH$), in order to prevent the touch device working abnormally due to the great narrowband noise.

As to the detailed operations of the frequency selecting module 108 please refer to the followings. In an example, the storage unit 110 stores the sensing signal TS when the driving signals D_1-D_A do not drive the touch device 100. The spectrum calculating unit 112 transforms the sensing signal TS via the FFT to acquire the amplitudes of the sensing signal TS at the plurality sampling points as the spectrum data FREQD. In this example, the resolution of the FFT is 25 kHz. That is, the spectrum data FREQD comprises an amplitude A25 at 25 kHz, an amplitude A50 at 50 kHz, an amplitude A75 at 75 kHz, and so on. Note that, the resolution of the FFT can be altered according to different applications and design concepts, and is not limited herein.

After the frequency data FREQD is acquired, the selecting unit 114 calculates the noise levels NL_100 k and NL_200 k of the operation frequencies FO_100 k (i.e. 100 kHz) and FO_200 k (i.e. 200 kHz), respectively. In this example, the selecting unit 114 calculates the sum of amplitudes of 5 sampling points around the operation frequency 100 kHz in the spectrum data FREQD (i.e. amplitudes A50, A75, A100, A125 and A150) as the noise level NO_100K. The selecting unit 114 calculates the sum of amplitudes of 5 sampling points around the operation frequency 200 kHz in the spectrum data FREQD (i.e. amplitudes A150, A175, A200, A225 and A250) as the noise level NO_200K. Next, the selecting unit 114 selects the operation frequency FO_100K or FO_200K as the working frequency FW via comparing the noise levels NL_100K and NL_200K. In an example, the noise level NL_100K is smaller than the noise level NL_200K and the selecting unit 114 selects the operation frequency FO_100K (i.e. 100 kHz) as the working frequency FW. In another example, the maximum amplitude in the spectrum data FREQD is the amplitude A50 (i.e. the main noise frequency Fnoise is 50 kHz), the predetermined frequency FTH is 25 kHz, and the noise level NL_100K is smaller than the noise level NL_200K. Since the difference between the operation frequency FO_100K and the main noise frequency Fnoise is greater than the predefined frequency FTH, the selecting unit 114 selects the operation frequency FO_100K as the working frequency FW. Instill another example, the maximum amplitude in the spectrum data FREQD is the amplitude A75 (i.e. the main noise frequency Fnoise is 75 kHz), the predetermined frequency FTH is 50 kHz, and the noise level NL_100K is smaller than the noise level NL_200K. Under such a condition, the selecting unit 114 selects the operation frequency FO_200K (i.e. 200 kHz) as the working frequency FW because the difference between the operation frequency FO_100K and the main noise frequency Fnoise is smaller than the predefined frequency FTH.

Note that, the plurality of operation frequencies FO_1-FO_C may not be the multiples of the resolution of the FFT. Under such a condition, the selecting unit 114 calculates the sums of amplitudes around the sampling points closest to each of the operation frequencies FO_1-FO_C as the noise levels NL_1-NL_C. In an example, one of the operation frequencies FO_1-FO_C is 333.3 kHz and the resolution of the FFT is 25 kHz. The selecting unit 114 calculates the sum of amplitudes of 5 sampling points around the sampling point 325 kHz closest to the operation frequency 333.3 kHz (i.e. the sum of amplitude A275, A300, A325, A350, and A375) as the noise level of the operation frequency 333.3 kHz.

The above examples transform the sensing signal generated by one of the plurality sensing channel in the touch system via the FFT, to rapidly acquire the spectrum data of the noise. According the spectrum data, the above examples selects the appropriate operation frequency as the working frequency of the touch system sensing the touch positions, so as to avoid the environment noise affecting the operations of the touch system. Via the present invention, the touch system can select the working frequency of the plurality of sensing channels in the touch system in a low cost and high frequency way. According to different applications and design concepts, those with ordinary skill in the art may observe appropriate alternations and modifications. For example, the sensing signal TS stored in the storage unit 110 may be a sum of multiples sensing signals among the plurality of sensing signals T_1-T_B when the driving signals D_1-D_A do not drive the touch device 100. Under such a condition, the spectrum data FREQD acquired by the spectrum calculating unit 112 becomes more close to the noise of real environment.

Figure 2:
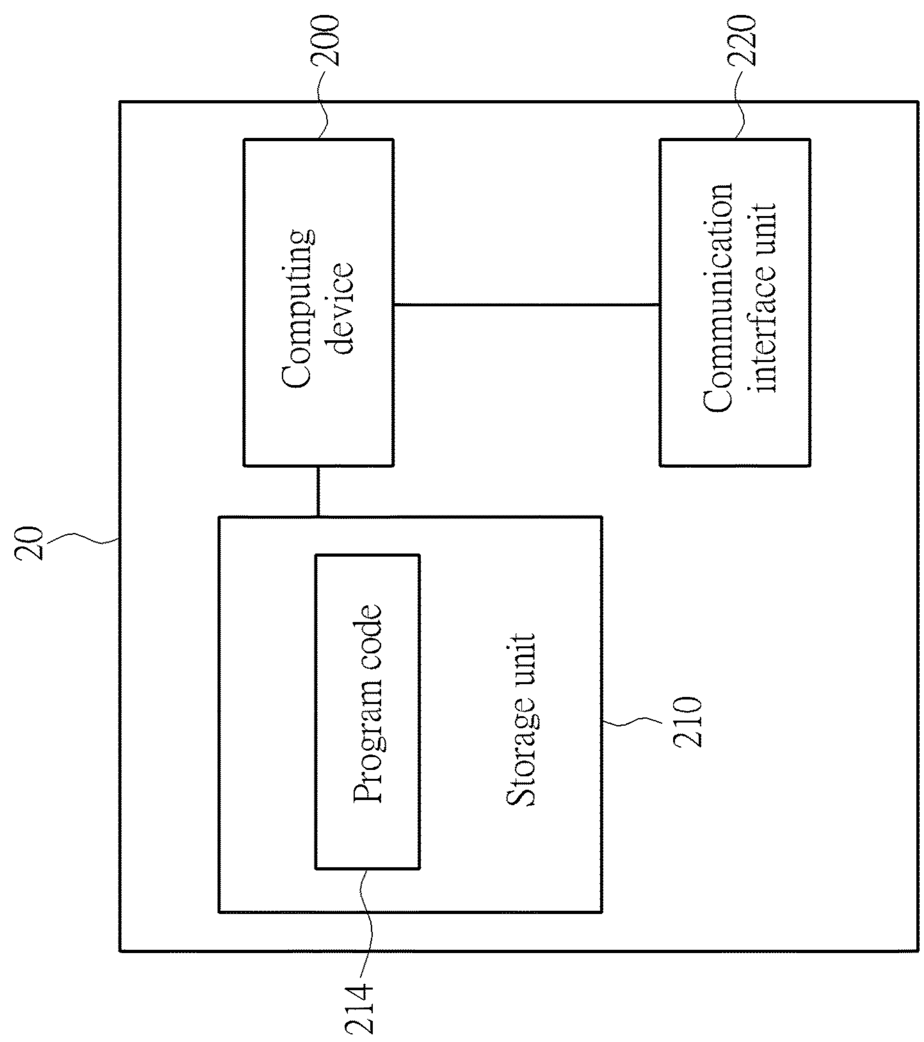
FIG. 2 is a schematic diagram of a frequency selecting module according to an example of the present invention.

In an example, the frequency selecting module 108 may be realized in different structures. Please refer to FIG. 2, which is a schematic diagram of a frequency selecting module 20 according to an example of the present invention. The frequency selecting module 20 may be the frequency selecting module 108 shown in FIG. 1 and includes a computing unit 200 such as a microprocessor or an Application Specific Integrated Circuit (ASIC), a storage unit 210 and a communication interface unit 220. The storage unit 210 may be any data storage device that can store a program code 214, accessed by the computing unit 200. Examples of the storage unit 210 include, but are not limited to, read-only memory, random-access memory, CD-ROM/DVD-ROM, magnetic tape, hard disk, and an optical data storage device. The communication interface unit 220 is utilized for transmitting and receiving data according to the computing processes of the computing unit 200.

Figure 3:
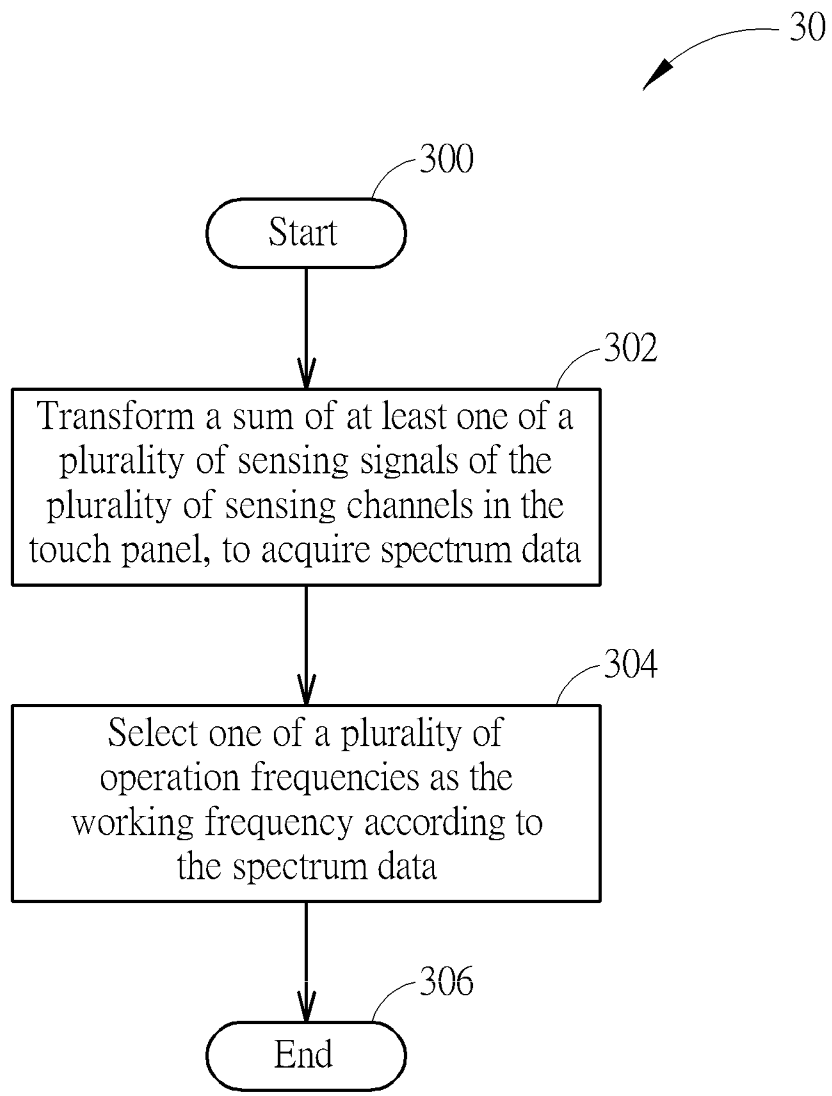
FIG. 3 is a flowchart of a frequency selecting method according to an example of the present invention.

The process of the frequency selecting module 108 calculating the spectrum data FREQD of the noise and selecting the working frequency FW can be summarized into a frequency selecting method 30 shown in FIG. 3. The frequency selecting method 30 is utilized in a touch system with a touch panel and is utilized for selecting a working frequency of a plurality sensing channels in the touch panel (e.g. the frequencies of the driving signals D1-DA and the sensing signals T_1-T_B received by the processing module 104). The frequency selecting method can be compiled into the program code 214 and comprises the following steps:

Step 300: Start.

Step 302: Transform a sum of at least one of a plurality of sensing signals of the plurality of sensing channels in the touch panel, to acquire spectrum data.

Step 304: Select one of a plurality of operation frequencies as the working frequency according to the spectrum data.

Step 306: End.

According to the frequency selecting method 30, the touch system first transforms a sum of at least one of a plurality of sensing signals generated by a plurality of sensing channels in the touch panel, to acquire spectrum data of the noise. In an example, the touch system transforms one of the plurality of sensing signals generated by the plurality of sensing channels when the plurality of sensing channel are not drove via FFT, to generate the spectrum data of the noise. Next, the touch system selects one of a plurality of operation frequencies as the working frequency of the plurality of sensing channels according to the spectrum data. For example, the touch system calculates a sum of amplitudes of a plurality of sampling points around each of the plurality of operation frequencies, to acquire a plurality of noise levels. Via comparing amplitudes of the plurality of the noise levels, the touch system selects the operation frequency with the minimum noise level among the plurality of noise levels as the working frequency of the plurality of sensing channels.

Note that, in order to avoid the touch system works abnormally because of the narrow band noise, the touch system may limit a difference between the working frequency and a main noise frequency to be greater than a predefined frequency, wherein the main noise frequency is the frequency corresponding to the maximum amplitude in the spectrum data.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the frequency selecting module 20.

The touch systems of the above examples utilize the FFT to transform the sensing signal of at least one of the plurality of sensing channels in the touch systems, so as to rapidly acquire the spectrum data of the noise. According to the spectrum data, the touch system selects appropriate operation frequency as the working frequency of the touch system sensing the touch positions, to avoid the noise effecting the operations of the touch system in a low cost and high efficiency way.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A frequency selecting module for a touch system, comprising:

a storage unit, for storing a sum of at least one of a plurality of sensing signals of a plurality sensing channels in the touch system;

a spectrum calculating unit, for transforming the sum of the at least one of the plurality of sensing signals stored in the storage unit to generate a spectrum data and storing the spectrum data to the storage unit; and a selecting unit, for generating an adjusting signal according to the spectrum data to select one of a plurality of operation frequencies as a working frequency of the plurality of sensing signals;

wherein the selecting unit calculates the sum of a plurality of amplitudes of a plurality of sampling points around each of the plurality of operation frequencies to acquire a plurality of noise levels and selects the operation frequency corresponding to the minimum noise level among the plurality of noise levels as the working frequency of the plurality of sensing signals.

2. The frequency selecting module of claim 1, wherein the storage unit stores the sum of at least one of the plurality of sensing signals when the plurality of sensing channels are not drove.

3. The frequency selecting module of claim 1, wherein the spectrum calculating unit utilizes Fast Fourier Transform to transform the sum of the at least one of the plurality of sensing signals via, to generate the spectrum data.

4. The frequency selecting module of claim 1, wherein the spectrum data comprises a main noise frequency corresponding to the maximum amplitude in the spectrum data and a difference between the working frequency and the main noise frequency is greater than a predefined frequency.

5. A processing device for a touch system, comprising:

a processing module, for receiving a plurality of sensing signals of a plurality of sensing channels in the touch system and generating a plurality of driving signals for driving the plurality of sensing channels; and a frequency selecting module, comprising:

a storage unit, for storing a sum of at least one of a plurality of sensing signals of a plurality sensing channels in the touch system;

a spectrum calculating unit, for transforming the sum of the at least one of the plurality of sensing signals stored in the storage unit to generate a spectrum data and storing the spectrum data to the storage unit; and a selecting unit, for generating an adjusting signal according to the spectrum data to select one of a plurality of operation frequencies as a working frequency of the plurality of sensing signals;

wherein the selecting unit calculates the sum of a plurality of amplitudes of a plurality of sampling points around each of the plurality of operation frequencies to acquire a plurality of noise levels and selects the operation frequency corresponding to the minimum noise level among the plurality of noise levels as the working frequency of the plurality of sensing signals.

6. A frequency selecting method for a touch system, comprising:

transforming at least one of a plurality of sensing signals of a plurality of sensing channels in the touch system, to generate spectrum data;

calculating the sum of a plurality of amplitudes of a plurality of sampling points around each of the plurality of operation frequencies to acquire a plurality of noise levels; and selecting the operation frequency corresponding to the minimum noise level among the plurality of noise levels as a working frequency of the plurality of sensing signals.

* * * * *